United States Patent [19]
Brown

[11] Patent Number: 5,822,530
[45] Date of Patent: Oct. 13, 1998

[54] METHOD AND APPARATUS FOR PROCESSING REQUESTS FOR VIDEO ON DEMAND VERSIONS OF INTERACTIVE APPLICATIONS

[75] Inventor: Ralph W. Brown, Boulder, Colo.

[73] Assignee: Time Warner Entertainment Co. L.P., Stamford, Conn.

[21] Appl. No.: 572,306

[22] Filed: Dec. 14, 1995

[51] Int. Cl.$^6$ .................................................. H04N 7/173
[52] U.S. Cl. .......................... 395/200.49; 348/7; 455/4.2
[58] Field of Search .................. 395/200.47, 200.48, 395/200.49; 348/7, 12, 13, 14, 15, 16, 17, 18, 19; 455/4.2, 5.1; H04N 7/173, 7/16

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,255,267 | 10/1993 | Hansen et al. . |
| 5,311,423 | 5/1994 | Clark . |
| 5,343,239 | 8/1994 | Lappington et al. . |
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,412,720 | 5/1995 | Hoarty . |
| 5,421,031 | 5/1995 | De Bey . |

(List continued on next page.)

OTHER PUBLICATIONS

Adams, Michael, "Network Design and Implementation of a large–scale, ATM, Multimedia Network," *Engineer Conference Notes* from NETWORLD$^{SM}$+INTEROP® 95, Las Vegas, NV (Mar. 27–31, 1995).

Adams, Michael, "Real Time MPEG Asset Delivery over ATM," *NCTA Technical Papers*, 1995:315–326 (1995).

News Release, "Time Warner Introduces World's First Full Service Network in Orlando," TIMEWARNER CABLE Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 1995:258–266 (1995).

*Primary Examiner*—Chris Grant
*Attorney, Agent, or Firm*—Homer L. Knearl; Holland & Hart llp

[57] ABSTRACT

For an interactive communication system, a method and apparatus for processing requests for video-on-demand versions of interactive applications. One embodiment initially receives a request to transmit a video on-demand version of a particular interactive application. This embodiment then determines if transmission of this video-on-demand version would constrain resources of the interactive communication system. If the system's resources would not be constrained, the interactive system provides the viewer with the video-on-demand version of the interactive application. On the other hand, if the system's resources would be constrained by the transmission of the VOD version, then the invention (1) denies the request for the video-on-demand version, and (2) directs the requesting viewer to view a near video-on-demand version of the particular application.

24 Claims, 7 Drawing Sheets

U.S. PATENT DOCUMENTS

| | | |
|---|---|---|
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,779 | 9/1995 | Dan et al. ................... 348/7 |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,646,676 | 7/1997 | Dewkett et al. ........................... 348/7 |

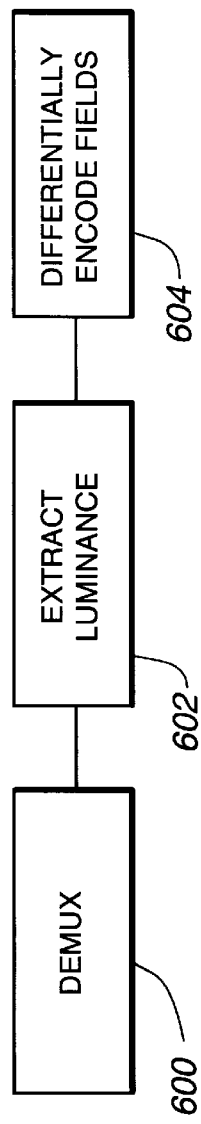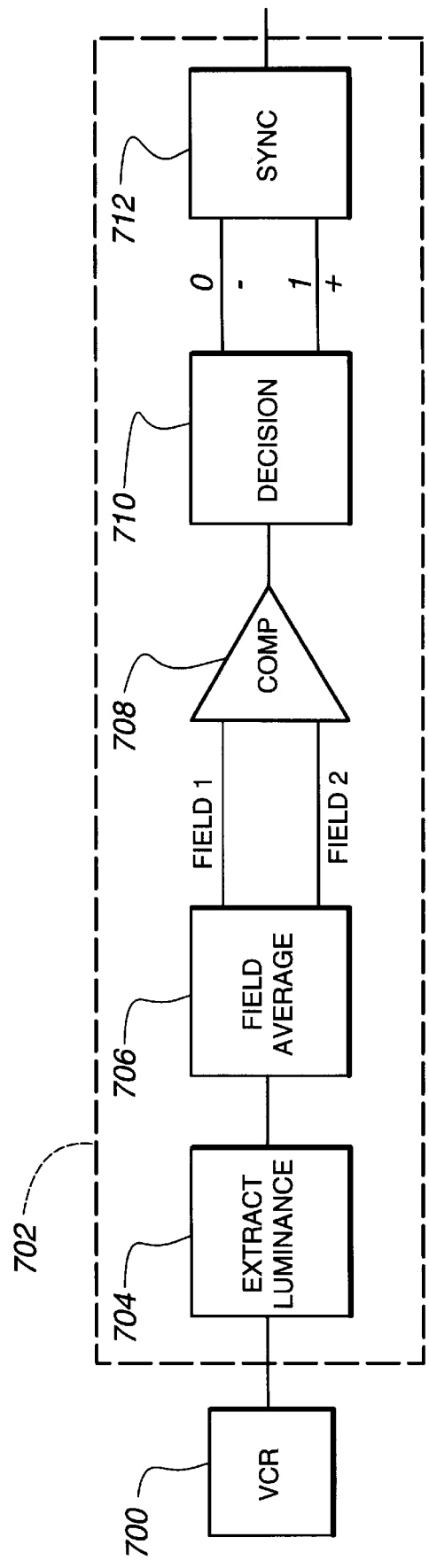

METHOD AND APPARATUS FOR PROCESSING REQUESTS FOR VIDEO ON DEMAND VERSIONS OF INTERACTIVE APPLICATIONS

The present invention is directed towards a method and apparatus for processing request for video-on-demand versions of interactive applications.

BACKGROUND OF THE INVENTION

Traditionally, television has been used as a passive device, that only allows a viewer to control the volume and channel, while reserving control of the content as well as the presentation time and format for the service provider. In recent years, however, a number of interactive systems have been created, in order to enable viewers to use their televisions as interactive devices.

Specifically, with the advent of interactive services in the home entertainment field, televisions have become active devices, that allow their viewers greater flexibility and control over the content, the presentation time, and the presentation format of their selected interactive applications. Interactive applications are stored programs, whose operations are wholly or partly controlled by commands from local viewing nodes of the interactive system.

Interactive systems utilize a mix of broadcast and point-to-point communication modes. In particular, interactive systems transmit shared, one-way, broadcast digital information streams to all their subscribers, in order to provide cable and network programming to their subscribers. Interactive systems also utilize a number of dedicated, two-way communication paths to (1) provide interactive applications from a central service source to a local viewing node, and (2) relay commands from the local viewing node to the central service source. In addition, some interactive systems transmit interactive applications through shared information streams.

Establishing a dedicated communication link expends a certain amount of an interactive system's shared resources (such as a service source's server resources, a communication network's transmission bandwidth and switching resources, etc.). Consequently, as typical interactive systems have finite resources due to financial considerations, these systems do not transmit each of their interactive applications to all of their possible viewers over dedicated communication links simultaneously. Rather, efficient interactive systems are often designed to handle specified peak dedicated-path-usage rates, which are computed by using statistics and probability. This type of peak rate design is analogous to the peak rate design used in telephone systems, which similarly use such a design for reducing hardware costs.

One manner by which prior art interactive systems minimize hardware costs is by only using a near-video-on-demand (NVOD) movie presentation format to provide features similar to VCR functional features (e.g., provide skip forward, skip backward, and pause features to emulate fast forward, rewind, pause VCR features). To emulate VCR functional features exactly, an interactive entertainment system would have to provide a true video-on-demand (VOD) presentation of an interactive application to a viewer. A VOD presentation of an interactive application is a version of the application that is transmitted to the viewer over a dedicated communication path. In other words, for a VOD presentation, the viewer would need to receive the interactive application through a dedicated communication link, which, in turn, would enable the viewer to completely control the presentation of the interactive application (i.e., would allow the viewer to exercise VCR functional features such as fast forward, rewind, pause, etc.).

However, in order to achieve network efficiency, prior art interactive entertainment systems forego VOD presentations of interactive applications, and thereby do not provide the exact VCR functional features to their viewers. Instead, prior art interactive entertainment systems provide their viewers NVOD presentations of interactive applications, in order to offer features that crudely approximate VCR functional features.

In NVOD programming, the interactive entertainment system broadcasts several time-shifted versions of an interactive application (i.e., broadcasts duplicate versions of the application, with the starting time of each version offset by a unique, predetermined time increment) to all of its subscribers over shared communication paths. Typically, interactive systems utilize NVOD services to provide several presentations of a movie, where the presentation start-times are staggered so that no two presentations start at the same time.

NVOD programming also permits an interactive system to emulate the functions of a VCR, by enabling the viewer to (1) stop viewing an originally-requested presentation of the interactive application, and (2) start viewing another presentation of the application that started earlier or later than the originally-requested presentation. For example, if the viewer selects the skip forward function, the system tunes to the NVOD presentation that started one or more intervals prior to the presentation that the viewer is presently watching. On the other hand, in response to a subscriber command to skip back, the subscriber receives the NVOD presentation that started one or more time intervals after the currently-viewed version.

Unfortunately, even when prior art interactive communication systems have sufficient resources to support VOD presentations, they unnecessarily limit themselves to only providing NVOD services, as a conservative means for saving their resources. Consequently, there is a need in the art for a method and apparatus for processing requests for VOD version of interactive applications. This method and apparatus should provide VOD service in a manner that conserves the interactive system's resources.

SUMMARY OF THE INVENTION

For an interactive communication system, the invention provides a method and apparatus for processing requests for video-on-demand (VOD) versions of interactive applications. One embodiment of the invention initially receives a request to transmit a video-on-demand version of a particular interactive application. This embodiment then determines if transmission of this video-on-demand version would constrain resources of the interactive communication system. If the system's resources would not be constrained, the interactive system provides the viewer with the video-on-demand version of the interactive application. On the other hand, if the system's resources would be constrained by the transmission of the VOD version, then the invention (1) denies the request for the video-on-demand presentation, and (2) directs the requesting viewer to view a near-video-on-demand (NVOD) version of the particular application.

BRIEF DESCRIPTION OF THE DRAWINGS

The novel features of the invention are set forth in the appended claims. However, for purpose of explanation, several embodiments of the invention are described by reference to the following figures.

FIGS. 5–6 present one embodiment of the invention for processing requests for video-on-demand versions of interactive applications.

DETAILED DESCRIPTION OF THE INVENTION

The invention provides a method and apparatus for processing requests for video-on-demand (VOD) versions of interactive applications. In the following description, numerous details are set forth for purpose of explanation. However, one of ordinary skill in the art would realize that the invention may be practiced without the use of these specific details. In other instances, well-known structures and devices are shown in block diagram form in order not to obscure the description of the invention with unnecessary detail.

The invention is adapted to operate in an interactive communication system. One embodiment of the invention initially receives a request to transmit a video-on-demand version of a particular interactive application. This embodiment then determines if the transmission of the VOD version of the requested application would constrain the shared resources of the interactive communication system. As discussed below, one embodiment of the invention makes this determination by utilizing a mathematical expression to determine the available capacity of the system. In other words, one embodiment of the invention utilizes a mathematical relationship to determine whether the interactive system's shared resources have sufficient bandwidth to support the transmission of the requested VOD version.

Alternatively, as further discussed below, another embodiment of the invention makes this determination by ascertaining whether the transmission of the VOD version would cause the number of transmitted VOD versions of the requested application to exceed a pre-specified maximum number. For example, one embodiment of the invention denies the VOD request if it ascertains that the number of currently transmitted VOD versions of the requested application equals a pre-specified maximum number.

Another embodiment of the invention conserves the systems resources by limiting the total number of transmitted VOD versions for all interactive applications. Specifically, instead of maintaining individual limits for the number of transmitted VOD versions of each interactive application, one embodiment of the invention limits the number of transmitted VOD versions of all interactive applications. Consequently, when the number of all transmitted VOD versions reaches its maximum value, this embodiment of the invention determines that additional VOD transmissions would constrain the system resources, and therefore denies VOD requests until one or more of the active VOD sessions terminate.

One embodiment of the invention provides the viewer with the requested VOD version, if the transmission of the requested VOD version would not constrain resources of the system. On the other hand, if the system's resources would be constrained by the transmission of the requested VOD version, then one embodiment of the invention (1) denies the request for this presentation, and (2) directs the requesting viewer to view a near-video-on-demand (NVOD) version of the particular application.

Figure 1:
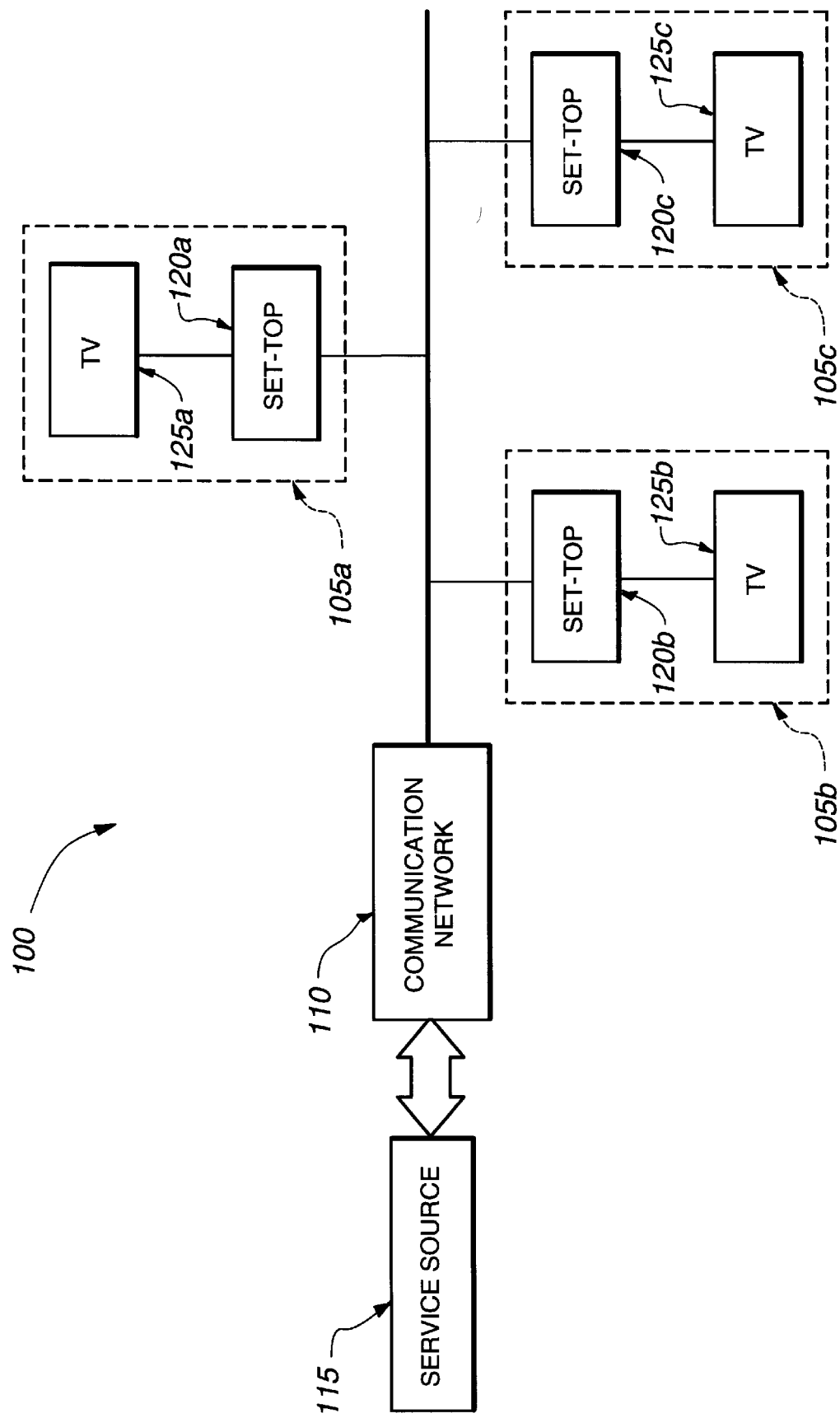
FIG. 1 presents an interactive communication system used by the invention.

FIG. 1 presents an interactive communication system 100 used by the invention. This system includes a number of home terminal nodes 105, a communication network 110, a service source 115. As shown in FIG. 1, each home terminal node 105 includes a set-top terminal 120 and a television 125. Each set-top controls the operation of its corresponding television. In particular, through communication network 110, a set-top (1) establishes a communication link between the television viewer and the service source, (2) presents, via the television, selectable programming options provided by the service source to the viewer, and (3) relays program selections from the viewer to the service source.

Figure 2:
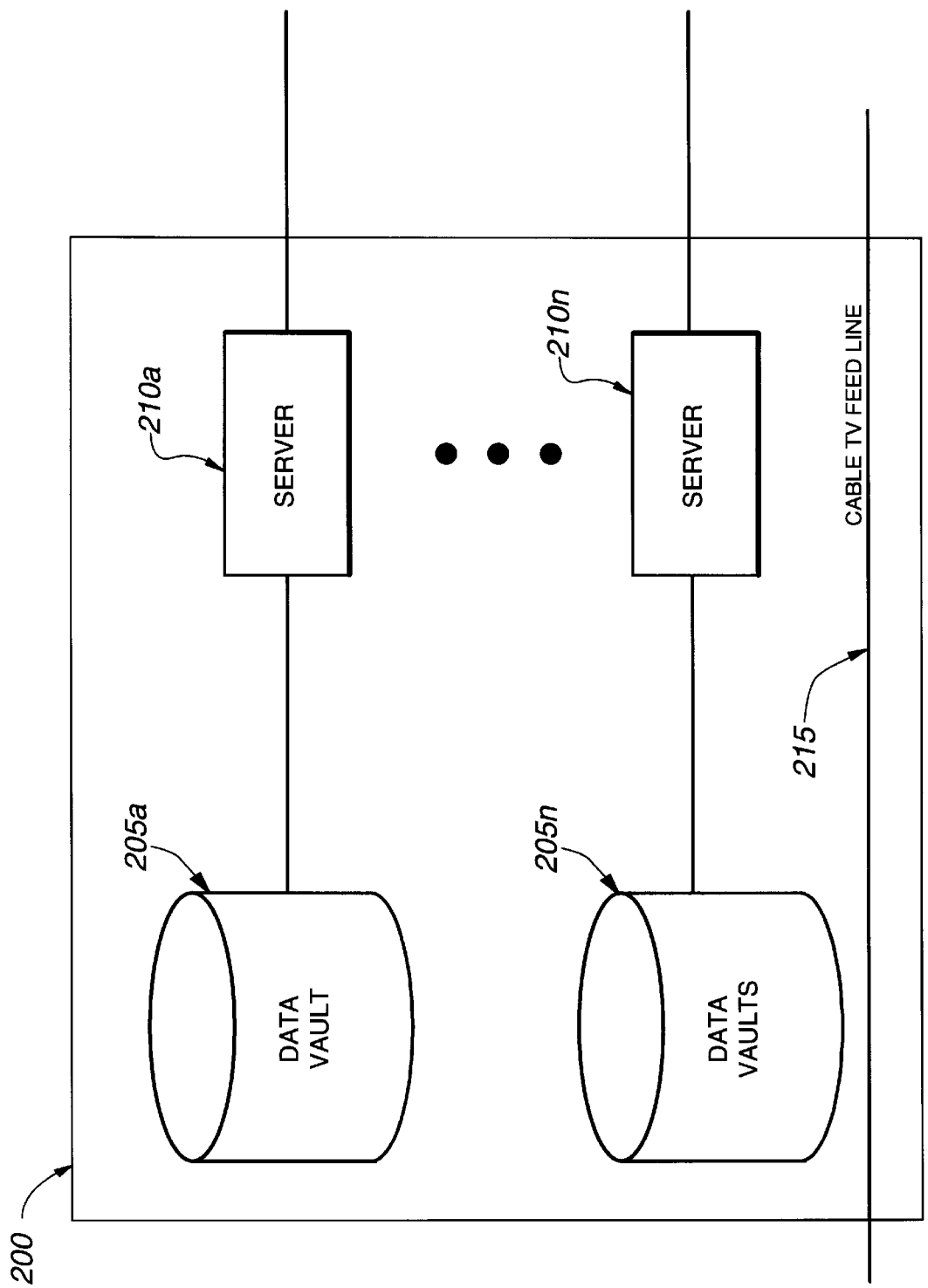
FIG. 2 presents an example of a service source used in the interactive communication system of FIG. 1.

FIG. 2 presents an example of a service source used in the interactive communication system of FIG. 1. As shown in FIG. 2, one example of the service source includes a number of data storage vaults 205, a number of media servers 210, and a cable TV feedline 215. Service source 200 utilizes data storage vaults 205 and media servers 210 to provide a variety of interactive digital services to the subscribers of the system. Specifically, data storage vaults 205 are used to store the digital programming content, and media servers 210 are used to retrieve the stored digital media in response to requests from the home terminal nodes.

The retrieved digital programs can then be transmitted through a shared information stream or a dedicated information stream. A shared information stream is used to transmit data to a number of subscribers, while a dedicated information stream is used to transmit data to a specific user. In addition, an information stream can be assigned all or part of a frequency band used by the network. As further shown in FIG. 2, service source 200 also has a cable feedline 215, which receives cable programming from the local cable company and supplies this programming to the network. The network then broadcasts the cable programming to all of the system's subscribers on shared information streams.

Figure 3:
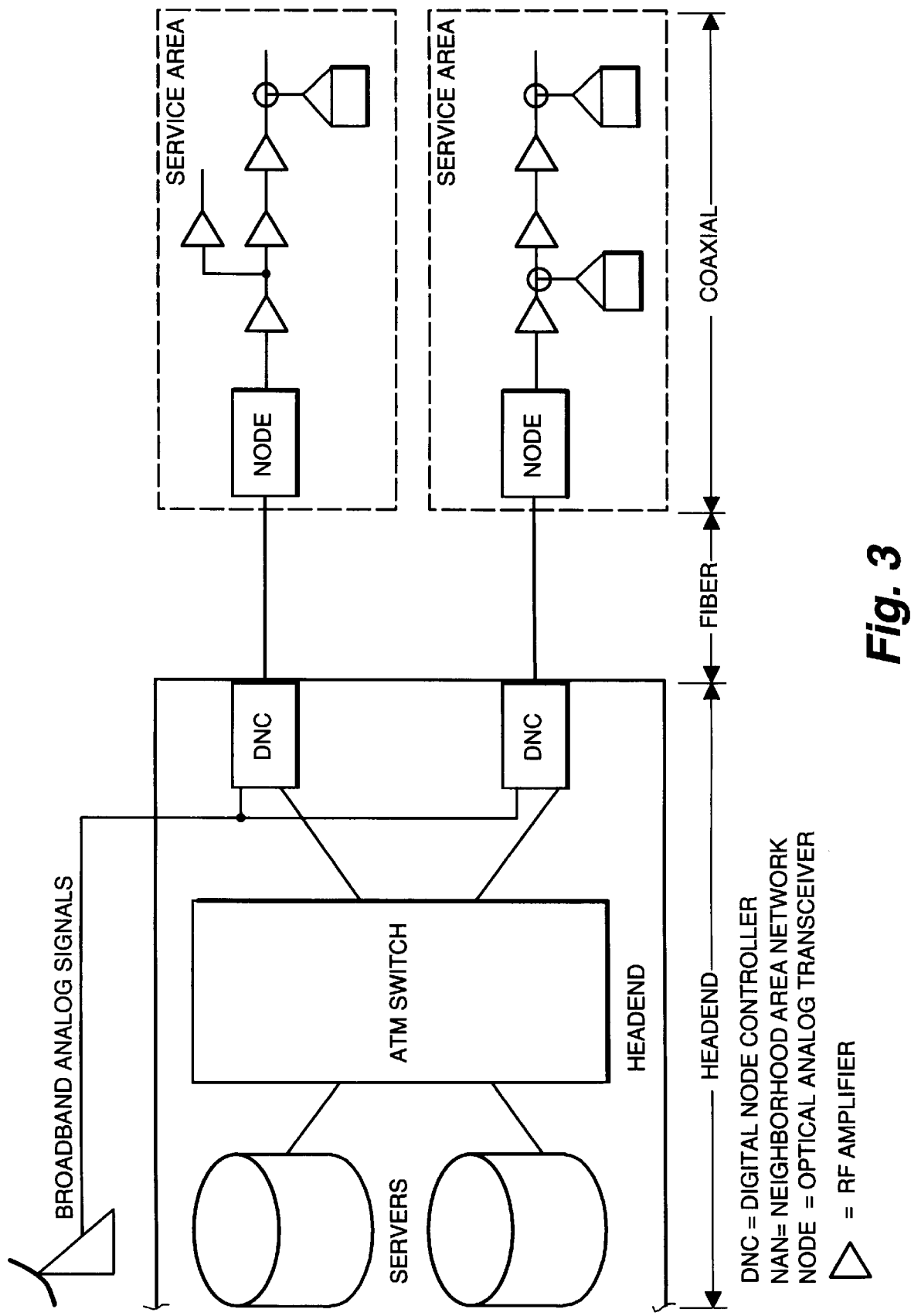
FIG. 3 presents another interactive communication system used by the invention.

FIG. 3 presents another interactive entertainment system used by the invention. A description of this interactive entertainment system is provided in the United States Application entitled "A Method For Message Addressing In A Full Service Network," filed on Dec. 14, 1995, and assigned to the assignee of the present application. The disclosure of this application is incorporated in the present application by reference.

Figure 4:
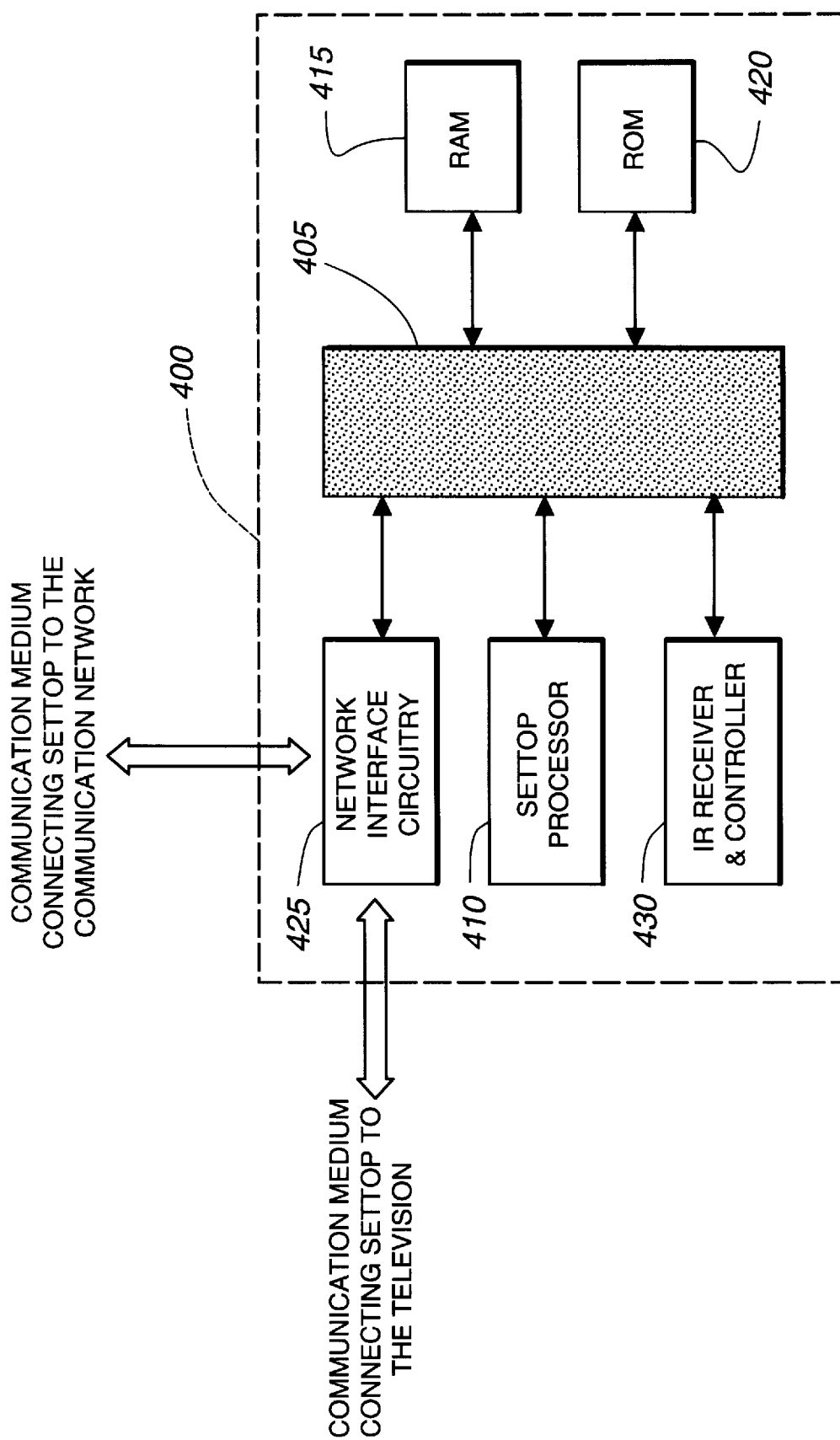
FIG. 4 presents a server used in the service source of the interactive communication system of FIG. 1.

FIG. 4 presents a server 400 used in service source 200 of FIG. 2. This server is used to retrieve stored digital interactive applications from data vaults, and to supply these applications to the communication network for transmission to the home terminal nodes. In particular, the role of the video server is to provide storage and playback of the video data and to respond to subscriber requests, such as "pause," "fast forward," "view the next product," etc. In addition, during operation, the service source's servers also store the operating system necessary for the operation of the interactive communication system.

Server 400 has a shared memory SMP (Symmetric Multiprocessing) architecture, which includes a high-speed system bus interconnecting processors, memory, and data and network I/O subsystems. Specifically, as shown in FIG. 4, server 400 includes internal bus 405, processors 410, shared random access memory 415, read-only memory (ROM) 420, network interface 425, and data vault I/O interface 430. High-speed bus 405 represents the collective communication interface between the numerous internal modules of server 400. In addition, this sever utilizes processors 410 for processing digital signals, and thereby controlling the managing of the operation of the server.

Processors 410 are directed by the software and firmware instructions that respectively reside in RAM 415 and ROM 420. In particular, in one embodiment of the invention, server 400 utilizes RAM 415 to store code necessary for the operation of the invention (i.e., server 400 utilizes the software residing in RAM 415 to direct the invention's processing of VOD requests by guiding the actions of processors 410). In another embodiment of the invention, the firmware instructions (i.e., the code residing in ROM 420) direct the invention's processing of VOD requests. Server 400 also uses RAM 415 to store temporary variables or other intermediate information during the operation of the processor.

Because the memory and I/O devices are shared equally among all of the processors in the system, this server's architecture is called a symmetric multiprocessor system. Typically, SMP systems scale from one processor to as many as 36 processors. Examples of SMP architecture include the Silicon Graphics, Inc. Challenge server systems and the Sun Microsystems, Inc. SPARC server systems.

In the SMP architecture, the processing load is uniformly distributed across all of the processors in the system. Scheduling algorithms in the kernel allocate processing load to unoccupied or lightly loaded processors. All processors have equal access to the physical memory and see a uniform memory image. Data written to the shared memory by one processor is immediately available to all the other processors. Software processes, both kernel and user, are able to run concurrently, and can be switched arbitrarily among any of the processors in the computer. Since all of the processors are operating out of shared memory, access to critical data and code is protected by locking mechanisms that prevent concurrent access.

As further shown in FIG. 4, server 400 also includes data vault interface 430. Through this interface, server 400 reads out data from one or more data vaults, and transfers this data to a buffer area in the shared memory 415. The data is then transferred from this buffer area to network interface 425 for transmission to the communication network. In one embodiment of the invention, the network interface is an ATM network interface which transfers data to an ATM switch for transmission. Finally, one of ordinary skill in the art would recognize that numerous alternative embodiments of server 210 (FIG. 2) exist. For example, in one embodiment of the invention, the service source's servers have an MPP (Massively Parallel Processor) architecture.

Figure 5:
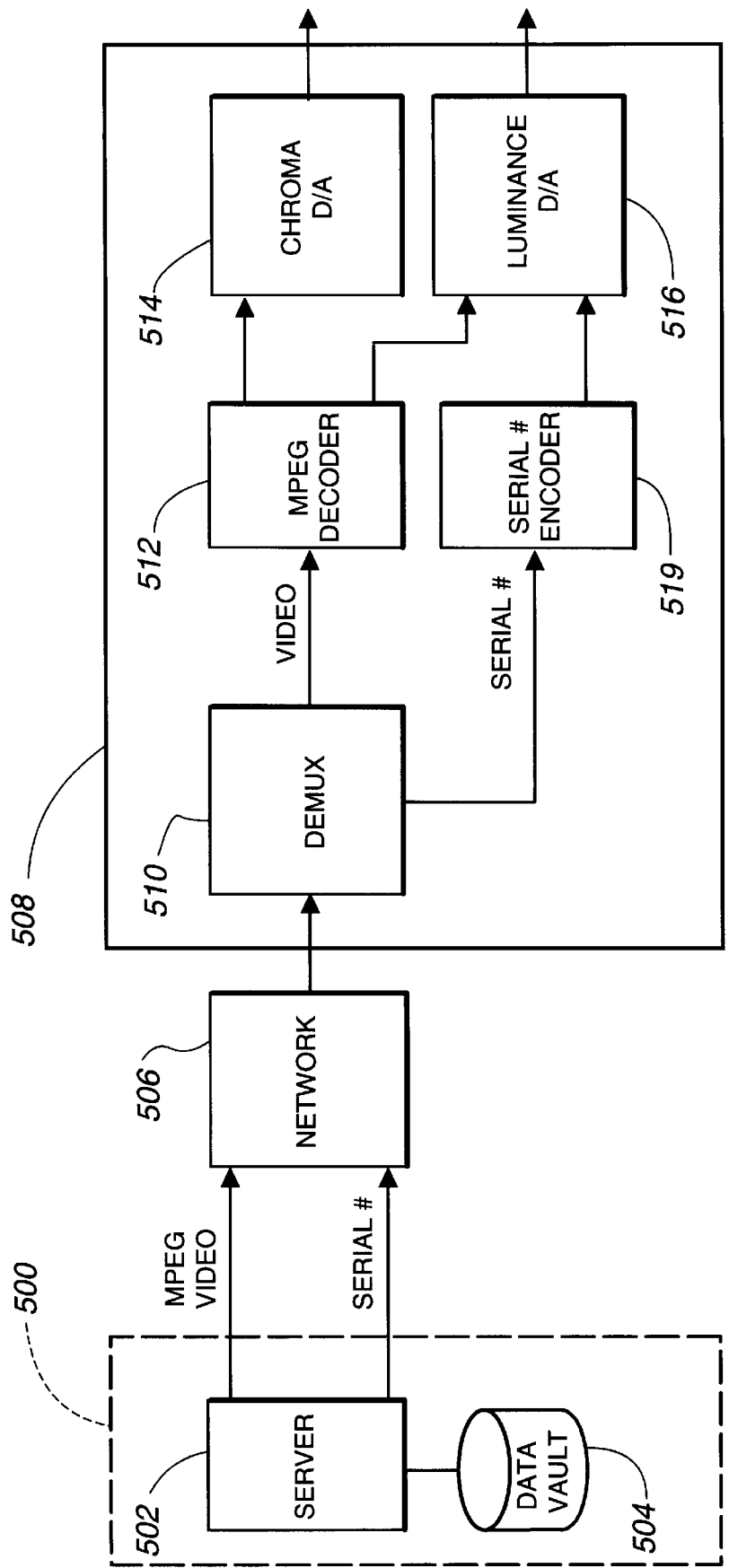
Figure 8:
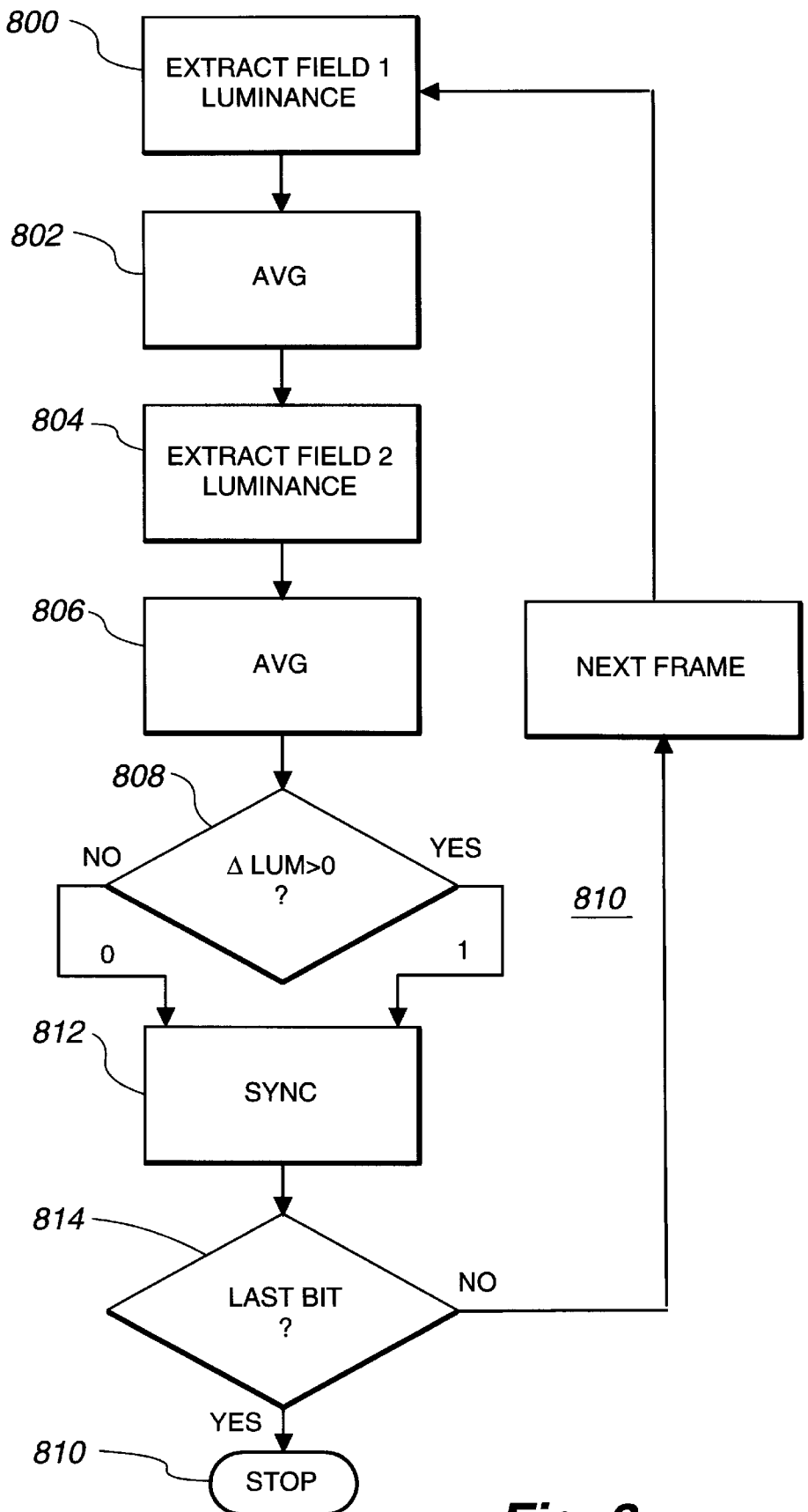

FIGS. 5 and 6 present one embodiment of the invention for processing requests for VOD versions of an interactive application. This embodiment of the invention can be implemented as a software or a firmware code of the server or the set-top. The following description pertains to the embodiment of the invention that is implemented as the software of the server.

The initial step in the flowchart of FIG. 5 is start step 505. At this step, the process starts at a pre-specified date and time. For example, in one embodiment of the invention, process 500 starts when several copies of the particular interactive application are stored in the data vaults of the service source. The process then transitions to step 510, during which the server presets the value of several variables to zero.

These variables include VOD-customer-count variable N and NVOD-customer-count variable $M_z$. Variable N represents the number of customers that are currently viewing VOD versions of the particular interactive application. In addition, each variable $M_z$ represents the number of customers currently viewing, or currently waiting in a queue to view, an NVOD presentation of the particular interactive application. Finally, the subscript variable z (of the NVOD-customer-count variable M) represents a unique NVOD version.

From step 510, the process transitions to step 515, where it remains until a viewer requests a new VOD session. If a viewer does make such a request, the process transitions to step 520, during which a decision is made as to the value of VOD-customer-count variable N. If this variable does not equal the maximum VOD-customer-count value, then the process transitions to step 525 (1) to start the requested VOD session by transmitting a video presentation of the interactive application through a dedicated information stream, and (2) to increment the VOD-customer-count variable N by one.

On the other hand, if (at step 520) a determination is made that the VOD-customer-count variable N equals the maximum VOD-customer-count value, the process transitions to step 530 to deny the request for the VOD presentation in order to conserve the resources of the interactive system. Next, the process transitions to step 535, where it asks the viewer whether she wants to view NVOD session z, which is the closest NVOD session to the requested VOD session. If not, the process transitions back to step 515 to wait for additional VOD requests.

However, if the viewer wants to view NVOD session z, the process transitions to step 540 (1) to increment the NVOD-count-variable $M_z$ (counting the number of subscribers viewing the NVOD session z) by one, and (2) to assign the viewer's request to the queue for the NVOD session z. From step 540, the process transitions back to step 515 to wait for additional VOD requests.

The embodiment of the invention has been described above by reference to FIG. 5, which conserves the shared resources of the system by having pre-specified limits for the number of transmitted VOD versions of each interactive application. However, one of ordinary skill would recognize that an alternative embodiment of the invention limits the number of transmitted VOD versions of all interactive applications, in order to prevent the system's shared resources from being constrained.

In other words, another embodiment of the invention conserves the systems resources by limiting the total number of transmitted VOD versions for all interactive applications. Consequently, when the number of all transmitted VOD versions reaches its maximum value, this embodiment of the invention determines that additional VOD transmissions would constrain the system resources, and therefore denies VOD requests until one or more of the active VOD sessions terminate.

Alternatively, another embodiment of the invention utilizes a mathematical relationship to determine that the transmission of the VOD version of the requested application would constrain the shared resources of the interactive communication system. In particular, one embodiment of the invention utilizes a mathematical expression to determine whether the interactive system's shared resources have sufficient bandwidth to support the transmission of the requested VOD version. One example of such a mathematical relationship is:

IF
{(Current_NetworkBandwidth+Requested_NetworkBandwidth)>Total_NetworkBandwidth)}, {(Current_SCSIBandwidth+Requested_SCSIBandwidth)>Total_SCSIBandwidth)},
{(Current_SwitchBandwidth+Requested_SwitchBandwidth)>Total_SwitchBandwidth)}, OR
{(Current_ServerBandwidth+Requested_ServerBandwidth)>Total_ServerBandwidth)},
THEN resources constrained.

In the above-recited equation, (1) NetworkBandwidth variables represent the capacity of the transmission frequency bands used by the communication network, (2) the SCSIBandwidth variables represent the relaying capacity of the SCSI interconnect connecting the servers to the data vaults, (3) the SwitchBandwidth variables represent the switching capacity of the ATM switches of the communication network, and (4) the ServerBandwidth variables represent the processing capacity of the servers.

In addition, the variables that have the "Current" prefix represent the portion of the particular bandwidth that is currently being used, while the variables that have the "Requested" prefix represent the portion of the particular bandwidth necessary for the transmission of the requested VOD version. Also, the variables that have the "Total" prefix represent the total amount of the particular bandwidth. The values of all these variables are determined by utilizing conventional traffic management algorithms.

For one embodiment of the invention, FIG. 6 set forth the steps performed by one of the service source's server during a NVOD presentation. The first step in the flowchart of FIG. 6 is the start step 605. At this step, process 600 begins at the specified time identified as the start time of the particular NVOD session. Next, the process transitions to step 610, where a decision is made as to the status of the NVOD-customer-count value. If this count is not greater than zero, the process transitions to step 615 to terminate the NVOD session.

On the other hand, if the count is greater than zero, the process transitions to step 620 to start transmitting the NVOD presentation on a shared information stream to the requesting subscribers. The process then transitions to step 625, and remains at this step until a viewer leaves the NVOD session. If a viewer leaves the NVOD session, the process transitions to step 630, where it decrements the NVOD-customer-count variable by one. From step 630, the process transitions to step 635 to determine whether the NVOD-customer-count variable equals to zero. If so, the process transitions to step 615 to terminate the particular NVOD session. Otherwise, the process transitions back to step 625 to wait for another viewer to leave the session (or wait for the session to terminate).

While the invention has been described with reference to numerous specific details, one of ordinary skill in the art would recognize that the invention can be embodied in other specific forms without departing from the spirit of the invention. For example, one of ordinary skill in the art would recognize that, although the invention has been described by reference to a home terminal node that includes a set-top terminal and a television, alternative embodiments of the invention utilize home terminal nodes that include a cable modem and a computer. In these embodiments, a display device of the computer is used for displaying the transmitted programming.

In addition, even though one embodiment of the invention has been described by reference to a terrestrial communication network, one of ordinary skill in the art would realize that an alternative embodiment of the invention utilizes a satellite communication system. Also, although each local viewing node 105 of FIG. 1 only has one set-top and one television, one of ordinary skill in the art would appreciate that in an alternative embodiment of the invention each local viewing node has multiple viewing stations. Thus, one of ordinary skill in the art would understand that the invention is not to be limited by the foregoing illustrative details, but rather is to be defined by the appended claims.

I claim:

1. In an interactive communication system, a method of processing requests for video-on-demand and near video-on-demand versions of interactive applications, said method comprising the steps of:
   (a) receiving a request from a viewer for transmission of a video-on-demand version of an interactive application;
   (b) determining if said transmission of said video-on-demand version of said interactive application would constrain resources of the interactive communication system; and
   (c) if said transmission of said video-on-demand version of said interactive application would constrain resources of the system, denying said request for transmitting said video-on-demand version of said interactive application and testing if the viewer then requests a near-video-on-demand version of said interactive application.

2. The method of claim 1 further comprising the step of providing said viewer with a near-video-on-demand version of said interactive application, if said transmission of said video-on-demand version would constrain resources of the system and if viewers then request a near-video-on-demand version of said interactive application.

3. The method of claim 1 further comprising the step of transmitting said video-on-demand version of said interactive application, if said transmission of said video-on-demand version would not constrain resources of the system.

4. The method of claim 1, wherein said determining step includes a step of determining if the number of currently presented video-on-demand versions of said interactive application equals a predetermined maximum value.

5. The method of claim 1, wherein said determining step includes a step of determining if the number of currently presented video-on-demand versions of a plurality of interactive applications equals a predetermined maximum value.

6. The method of claim 1, wherein said determining step includes a step of utilizing a mathematical relationship to determine whether said interactive system's resources have sufficient bandwidth to support the transmission of the requested video-on-demand version.

7. A computer program for executing a computer process, said computer program being storage medium readable by a computing system in an interactive communication system and encoding a program of instructions for processing requests for video-on-demand and near-video-on-demand versions of interactive applications, said computer process comprising the steps of:
   (a) receiving request from a viewing node to transmit a video-on-demand version of an interactive application through a communication network;
   (b) determining if transmission of said video-on-demand version of said interactive application through the communication network would constrain shared resources of the interactive communications system; and
   (c) if said transmission of said video-on-demand version of said interactive application would constrain resources of the system, denying said request for transmitting said video-on-demand version of said interactive application and directing said viewing node to view a near-video-on-demand version of said interactive application.

8. The computer program of claim 7 with the computer process further comprising the step of transmitting said near-video-on-demand version of said interactive application, if said viewing node requests viewing said near-video-on-demand version of said interactive application.

9. The computer program of claim 7 with the computer process further comprising the step of transmitting said video-on-demand version of said interactive application, if said transmission of said video-on-demand version would not constrain resources of the system.

10. The computer program of claim 7, wherein said determining step of the computer process comprises a step of determining if the number of currently presented video-on-demand versions of said interactive application reaches a predetermined maximum value.

11. The computer program of claim 7, wherein said determining step of the computer process comprises a step of determining if the number of currently presented video-on-demand versions of a plurality of interactive application reaches a predetermined maximum value.

12. The computer program of claim 7, wherein said determining step of the computer process comprises a step of testing whether said interactive system's resources have sufficient bandwidth to support the transmission of the requested video-on-demand version.

13. An apparatus for processing requests for video-on-demand and near-video-on-demand versions of interactive applications, said apparatus adapted to operate in an interactive communication network, said apparatus comprising:
(a) receiving means for receiving a request from a viewing node in the communication network to transmit a video-on-demand version of an interactive application through the communication network;
(b) determining means, responsive to said receiving means, for determining if transmission of said video-on-demand version of said interactive application through the communication network would constrain shared resources of the interactive communication system; and
(c) directing means, responsive to said determining means, for denying said request for transmitting said video-on-demand version of said interactive application and directing the viewing node to view a near-video-on-demand version of said interactive application, when said transmission of said video-on-demand version of said interactive application would constrain resources of the system.

14. The apparatus of claim 13 further comprising transmitting means, responsive to said directing means, for transmitting said near-video-on-demand version of said interactive application, if said viewer requests viewing said near-video-on-demand version of said interactive application.

15. The apparatus of claim 14, wherein said transmitting means, responsive to said determining means, for transmitting said video-on-demand version of said interactive application when said transmission of said video-on-demand version would not constrain resources of the system.

16. The apparatus of claim 13, wherein said determining means comprises means for ascertaining if the number of currently presented video-on-demand versions of said interactive application exceeds a predetermined maximum value.

17. The apparatus of claim 13, wherein said determining means comprises means for ascertaining if the number of currently presented video-on-demand versions of a plurality of interactive applications exceeds a predetermined maximum value.

18. The apparatus of claim 13, wherein said determining means determines available bandwidth of said interactive system's resources in order to determine if said resources can support the transmission of the requested video-on-demand version.

19. An interactive communication system comprising:
(a) a service source storing a plurality of interactive applications;
(b) a plurality of viewing nodes for viewing said interactive applications; and
(c) a communication network coupling said service source and said viewing nodes;
(d) wherein said service source comprises means for processing requests for video-on-demand and near-video-on-demand versions of said interactive applications, said processing means comprising:
(1) detecting means for detecting a request from a viewing node to transmit a video-on-demand version of an interactive application through the communication network;
(2) determining means, responsive to the request detected by said detecting means, for determining whether or not transmission of said video-on-demand version of said interactive application through a communication network would constrain shared resources of the interactive communication system; and
(3) means, responsive to said determining means, for denying the request for transmitting said video-on-demand version of said interactive application and providing said viewing node with an option to view a near-video-on-demand version of said interactive application, when said determining means determines that transmission of said video-on-demand version of said interactive application would constrain resources of the system.

20. The apparatus of claim 19, wherein said processing means further comprises transmitting means, for transmitting said near-video-on-demand version of said interactive application, if said viewing node in response to the option requests viewing said near-video-on-demand version of said interactive application.

21. The apparatus of claim 20, wherein said transmitting means transmits said video-on-demand version of said interactive application when said determining means determines that transmission of said video-on-demand version would not constrain resources of the system.

22. The apparatus of claim 19, wherein said determining means determines if the number of currently presented video-on-demand versions of said interactive application exceeds a predetermined maximum value.

23. The apparatus of claim 19, wherein said determining means determines if the number of currently presented video-on-demand versions of a plurality of interactive applications exceeds a predetermined maximum value.

24. The apparatus of claim 19, wherein said determining means comprises means for calculating available bandwidth of said interactive system's resources in order to determine if said resources have sufficient bandwidth to support the transmission of the requested video-on-demand version.

* * * * *